US012048261B2

(12) United States Patent
Nakabayashi et al.

(10) Patent No.: US 12,048,261 B2
(45) Date of Patent: Jul. 30, 2024

(54) VEHICLE SPEED CONTROL SYSTEM

(71) Applicant: Kubota Corporation, Osaka (JP)

(72) Inventors: Takashi Nakabayashi, Sakai (JP);
Tomohiko Sano, Amagasaki (JP);
Osamu Yoshida, Amagasaki (JP);
Shotaro Kawahata, Amagasaki (JP);
Masayuki Horiuchi, Sakai (JP)

(73) Assignee: Kubota Corporation, Osaka (JP)

( * ) Notice: Subject to any disclaimer, the term of this patent is extended or adjusted under 35 U.S.C. 154(b) by 385 days.

(21) Appl. No.: 17/422,916

(22) PCT Filed: Dec. 23, 2019

(86) PCT No.: PCT/JP2019/050282
§ 371 (c)(1),
(2) Date: Jul. 14, 2021

(87) PCT Pub. No.: WO2020/149106
PCT Pub. Date: Jul. 23, 2020

(65) Prior Publication Data
US 2022/0087092 A1 Mar. 24, 2022

(30) Foreign Application Priority Data
Jan. 15, 2019 (JP) ................... 2019-004597

(51) Int. Cl.
G05D 1/00 (2024.01)
A01B 69/04 (2006.01)
(Continued)

(52) U.S. Cl.
CPC ........ *A01B 69/008* (2013.01); *A01D 41/1278* (2013.01); *F02D 41/0225* (2013.01);
(Continued)

(58) Field of Classification Search
CPC ................ A01B 69/008; A01B 69/007; A01D 41/1278; A01D 41/1274; A01D 69/00;
(Continued)

(56) References Cited

U.S. PATENT DOCUMENTS

2017/0042084 A1* 2/2017 Waitt ................... A01D 34/006
2021/0086658 A1* 3/2021 Koebler ................. B60W 10/11

FOREIGN PATENT DOCUMENTS

| JP | 6343331 A | | 12/1994 |
|---|---|---|---|
| JP | 89760 A | | 1/1996 |
| JP | H089760 A | * | 1/1996 |

* cited by examiner

*Primary Examiner* — Sohana Tanju Khayer
(74) *Attorney, Agent, or Firm* — The Webb Law Firm

(57) ABSTRACT

A vehicle speed control system that controls a vehicle speed of an agricultural vehicle that performs work using a work device while traveling using a traveling device, the agricultural vehicle performs work travel a plurality of times with non-work travel interposed therebetween, the vehicle speed control system including: a control unit configured to perform work travel control in which a vehicle speed is set according to a load on a motive power source that drives the traveling device and the work device; and a storage unit in which a vehicle speed that is set during the work travel is stored as an optimum vehicle speed, the control unit performs initial work travel control in which a vehicle speed at a time when the work travel is started after the non-work travel is set using the optimum vehicle speed that is stored during the work travel performed before the non-work travel.

13 Claims, 6 Drawing Sheets

(51) Int. Cl.
*A01D 41/127* (2006.01)
*F02D 41/02* (2006.01)

(52) U.S. Cl.
CPC ......... *G05D 1/0219* (2013.01); *G05D 1/0223*
(2013.01); *B60Y 2200/222* (2013.01); *F02D 2200/501* (2013.01)

(58) Field of Classification Search
CPC ........... F02D 41/0225; F02D 2200/501; F02D 29/02; G05D 1/0219; G05D 1/0223; G05D 2201/0201; B60Y 2200/222
See application file for complete search history.

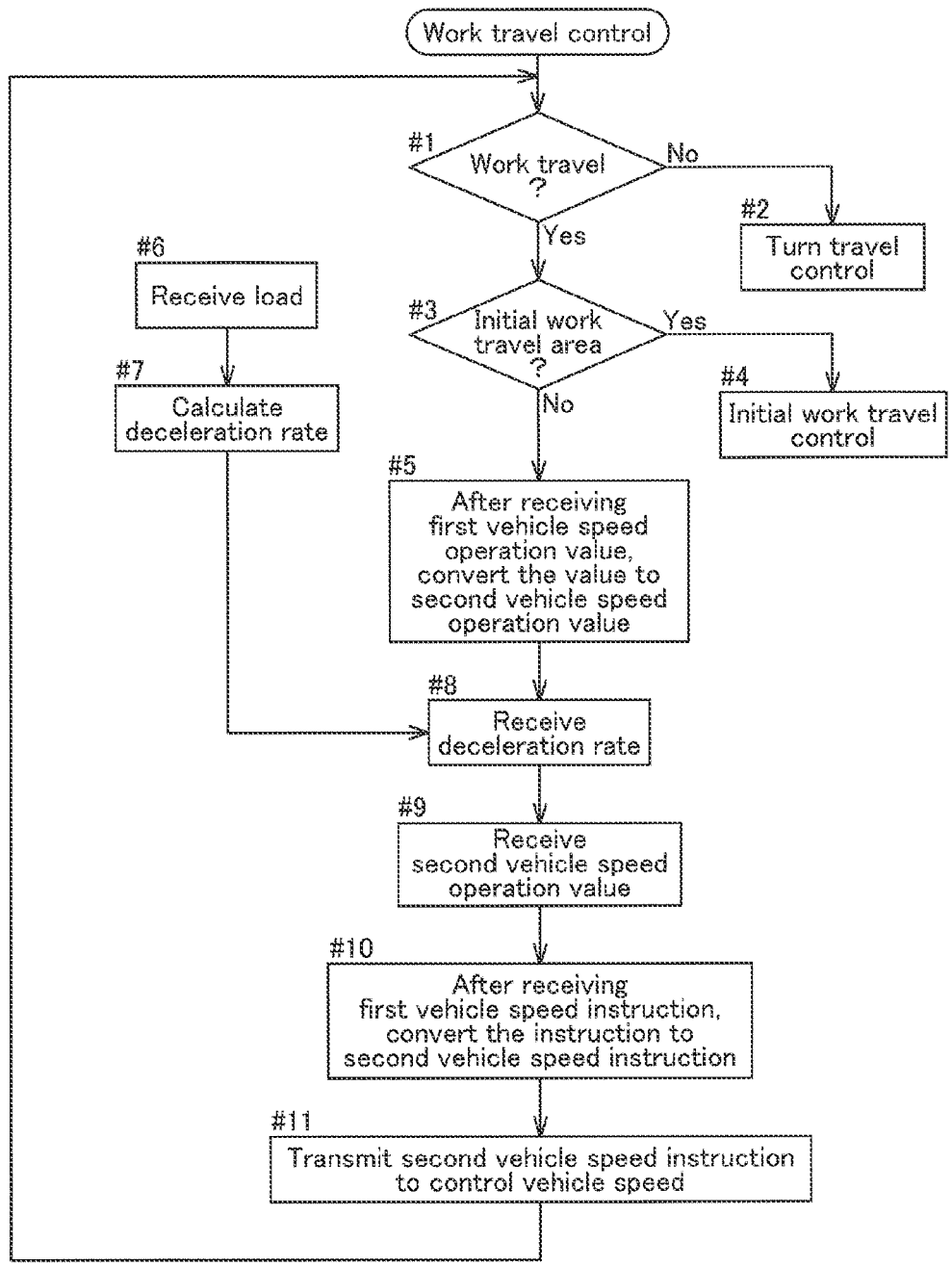

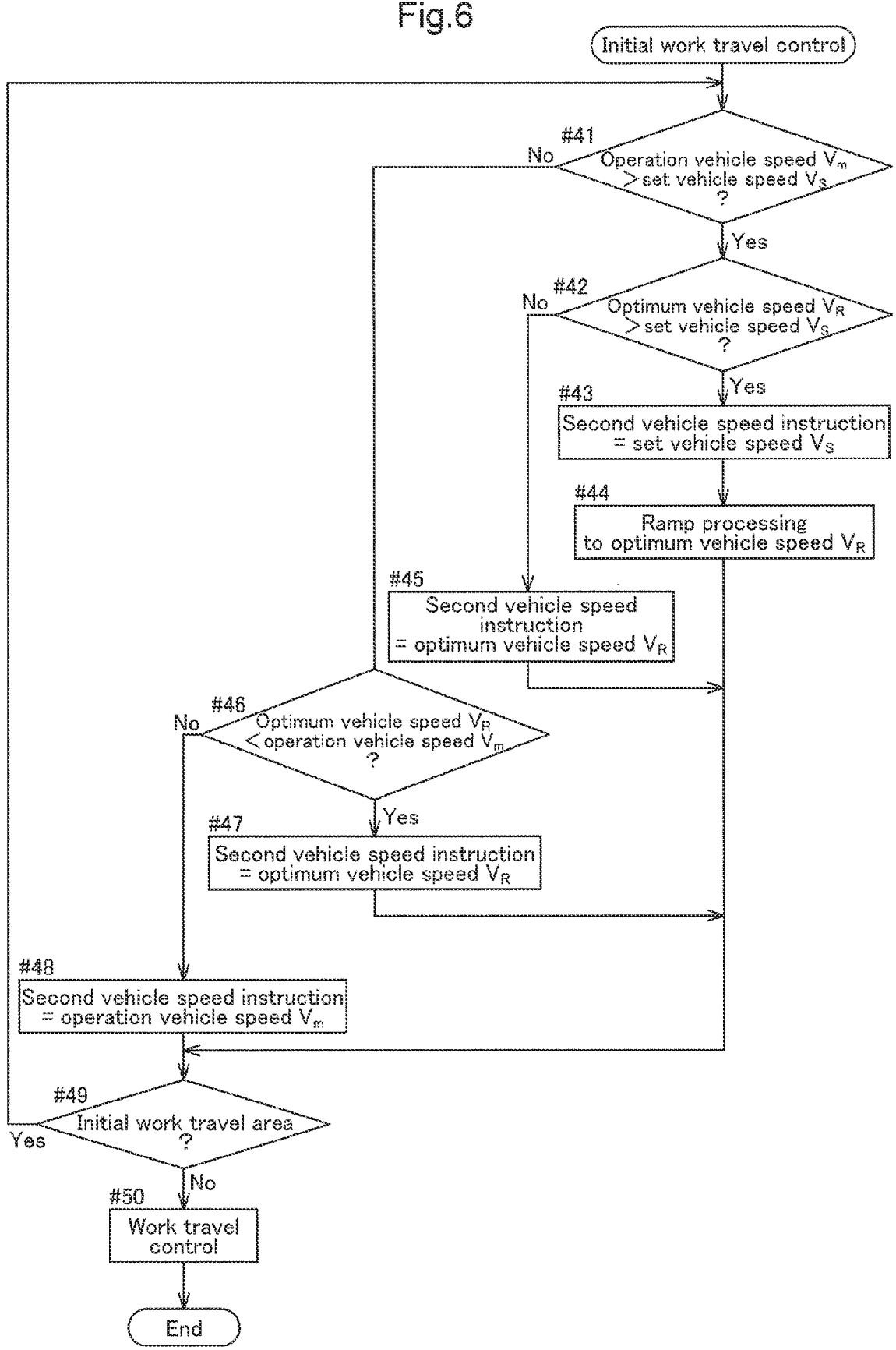

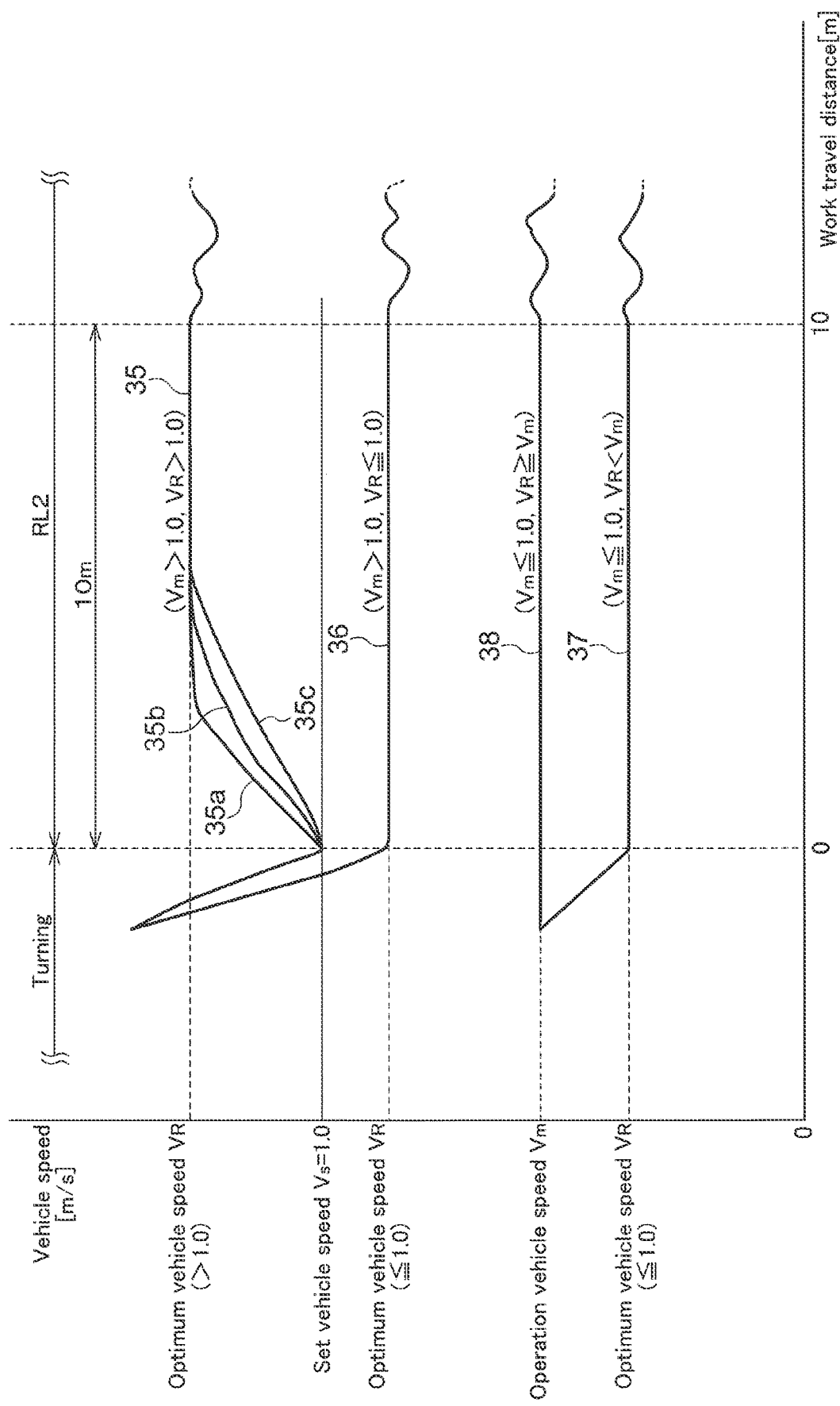

VEHICLE SPEED CONTROL SYSTEM

CROSS-REFERENCE TO RELATED APPLICATIONS

This application is the United States national phase of International Application No. PCT/JP2019/050282 filed Dec. 23, 2019, and claims priority to Japanese Patent Application No. 2019-004597 filed Jan. 15, 2019, the disclosures of which are hereby incorporated by reference in their entirety.

BACKGROUND OF THE INVENTION

Field of the Invention

The present invention relates to a vehicle speed control system for an agricultural vehicle that performs work while traveling.

Description of Related Art

An agricultural vehicle such as a combine performs agricultural work using a work device such as a reaping device while traveling using a traveling device. Both the traveling device and the work device are driven by a driving force that is generated as a result of rotation of an engine and is distributed and subjected to speed change. The work load on the work device varies depending on the state of a field or the like. Accordingly, in order for a sufficient driving force to be transmitted to the work device, the vehicle speed is adjusted by adjusting transmission of the driving force to the traveling device according to the work conditions. For example, the vehicle speed is adjusted so as to vary between a working state and a non-working state or is adjusted upon a change from a turning state to a non-turning state.

Patent Document 1: JP H6-343331A

SUMMARY OF THE INVENTION

However, the load on the work device varies depending on various conditions, and the required driving force varies. For example, in the case of a reaping device, which is an example of the work device, as the amount of culm that is reaped increases, the load applied to the reaping device increases and reaping may not be performed appropriately. When the load applied to the work device increases as described above, the load on the engine may increase and the engine may stop, and a problem may occur in the work performed by the work device as a result of the driving force of the engine not being appropriately transmitted to the work device.

An object of the present invention is to transmit a sufficient driving force to the work device.

In order to achieve the above object, a vehicle speed control system according to an embodiment of the present invention is a vehicle speed control system that controls a vehicle speed of an agricultural vehicle that performs work using a work device while traveling using a traveling device, wherein the agricultural vehicle performs work travel a plurality of times with non-work travel interposed therebetween, the vehicle speed control system including: a control unit configured to perform work travel control in which a vehicle speed is set according to a load on a motive power source that drives the traveling device and the work device; and a storage unit in which a vehicle speed that is set during the work travel is stored as an optimum vehicle speed, wherein the control unit performs initial work travel control in which a vehicle speed at a time when the work travel is started after the non-work travel is set using the optimum vehicle speed that is stored during the work travel performed before the non-work travel.

This configuration makes it possible to detect the possibility of a driving force transmitted to the work device being insufficient by detecting the load on the motive power source. Furthermore, by controlling the vehicle speed using the load so as to make the load smaller than or equal to a predetermined value, the driving force of the motive power source transmitted to the traveling device is limited, and the driving force transmitted to the work device is secured. As a result, a sufficient driving force is transmitted to the work device according to the work conditions, and work can be performed appropriately.

In the work travel control, there is a tendency for the accuracy of control to be unstable in an initial stage of the control and the optimum vehicle speed to be determined during work travel as a result of the control being continued. Also, in many cases, the optimum vehicle speed does not largely vary even when work travel is performed a plurality of times with non-work travel interposed therebetween. Accordingly, if the vehicle speed is set in an initial stage of work travel performed after non-work travel in consideration of a vehicle speed set during work travel performed before the non-work travel, the vehicle speed is accurately controlled even in the initial stage. As a result, a sufficient driving force is transmitted to the work device even in the initial stage of work travel, and the work can be performed appropriately.

It is preferable that the initial work travel control is performed over a predetermined work travel distance or for a predetermined period of time from when the work travel is started, and the work travel control is performed after the initial work travel control.

According to this configuration, the initial work travel control is performed for an appropriate period of time, and a sufficient driving force can be transmitted to the work device and the work can be appropriately performed continuously from the initial stage of the work travel.

It is preferable that the optimum vehicle speed is determined by averaging vehicle speeds that are set within a predetermined period before a vehicle speed that is set last and the last set vehicle speed, among vehicle speeds that are set during the work travel performed before the non-work travel.

Thus, in the work travel performed after the non-work travel, the initial work travel control is performed using an average value of the optimum vehicle speed determined in a latter part of the work travel control in the work travel performed before the non-work travel. With this configuration, the initial work travel control is performed using a more appropriate optimum vehicle speed. As a result, a sufficient driving force is transmitted to the work device even in the initial stage of the work travel, and the work can be performed appropriately.

It is preferable that the vehicle speed control system further includes a gear shift operation member that is used for manually adjusting the vehicle speed, wherein a reference value of the vehicle speed is set as a set vehicle speed in the initial work travel control, and in the initial work travel control, if a vehicle speed that corresponds to an operation made on the gear shift operation member is higher than the set vehicle speed and the optimum vehicle speed is higher than the set vehicle speed, the vehicle speed is set to the set vehicle speed and thereafter increased to the optimum vehicle speed, and if the vehicle speed corresponding to the operation made on the gear shift operation member is higher than the set vehicle speed and the optimum vehicle speed is lower than or equal to the set vehicle speed, the vehicle speed is set to the optimum vehicle speed.

Thus, when a vehicle speed that is requested by the worker through an operation is higher than the set vehicle speed, the vehicle speed in the initial work travel control and an initial value of the vehicle speed are determined based on the optimum vehicle speed and the set vehicle speed. Therefore, a more appropriate vehicle speed is set in the initial work travel control. As a result, a sufficient driving force is transmitted to the work device even in the initial stage of the work travel, and the work can be performed appropriately.

It is preferable that the vehicle speed is increased to the optimum vehicle speed at an acceleration rate that is determined based on the magnitude of the load, and the larger the load is, the lower the acceleration rate is.

If acceleration from the set vehicle speed to the optimum vehicle speed is performed through ramp processing corresponding to the magnitude of the load as described above, when the load is small, the vehicle speed is increased to the optimum vehicle speed faster than when the load is large. Thus, in the initial work travel control, the vehicle speed is increased to the optimum vehicle speed at a rate that corresponds to the load, and the vehicle speed is controlled more appropriately. As a result, a sufficient driving force is transmitted to the work device even in the initial stage of the work travel, and the work can be performed appropriately.

It is preferable that the vehicle speed control system further includes a gear shift operation member that is used for manually adjusting the vehicle speed, wherein a reference value of the vehicle speed is set as a set vehicle speed in the initial work travel control, and in the initial work travel control, if a vehicle speed that corresponds to an operation made on the gear shift operation member is lower than or equal to the set vehicle speed and the optimum vehicle speed is lower than the vehicle speed corresponding to the operation made on the gear shift operation member, the vehicle speed is set to the optimum vehicle speed, and if the vehicle speed corresponding to the operation made on the gear shift operation member is lower than or equal to the set vehicle speed and the optimum vehicle speed is higher than or equal to the vehicle speed corresponding to the operation made on the gear shift operation member, the vehicle speed is set to the vehicle speed corresponding to the operation made on the gear shift operation member.

When a vehicle speed that is requested by the worker through an operation is lower than or equal to the set vehicle speed, the vehicle speed in the initial work travel control is determined based on the vehicle speed requested by the worker through the operation and the optimum vehicle speed. Therefore, a more appropriate vehicle speed is set in the initial work travel control. As a result, a sufficient driving force is transmitted to the work device even in the initial stage of the work travel, and the work can be performed appropriately.

It is preferable that the control unit stores, as a first work width, a work width across which work was performed in the work travel before the non-work travel, in the storage unit, and corrects the optimum vehicle speed based on a ratio between the first work width and a second work width that is a work width across which work is to be performed in the work travel after the non-work travel.

The work travel may be performed across different work widths. A driving force that is necessary for the work device commonly depends on the work width. Accordingly, the optimum vehicle speed varies depending on the work width. If the optimum vehicle speed is corrected based on the work width, a more appropriate vehicle speed is set in the initial work travel control. As a result, a sufficient driving force is transmitted to the work device even in the initial stage of the work travel, and the work can be performed appropriately.

A change amount of a rotational frequency of the motive power source may be detected as the load.

In this case, the load can be detected easily.

The agricultural vehicle may automatically travel.

In this case, when the agricultural vehicle is automatically traveling, the work travel can be performed at an appropriate vehicle speed, a sufficient driving force is transmitted to the work device, and the work can be performed appropriately.

BRIEF DESCRIPTION OF THE DRAWINGS

FIG. 5 is a diagram showing a flow of work travel control.

FIG. 6 is a diagram showing a flow of initial work travel control.

FIG. 7 is a diagram showing an example of the initial work travel control.

DETAILED DESCRIPTION OF PREFERRED EMBODIMENTS

Figure 1:
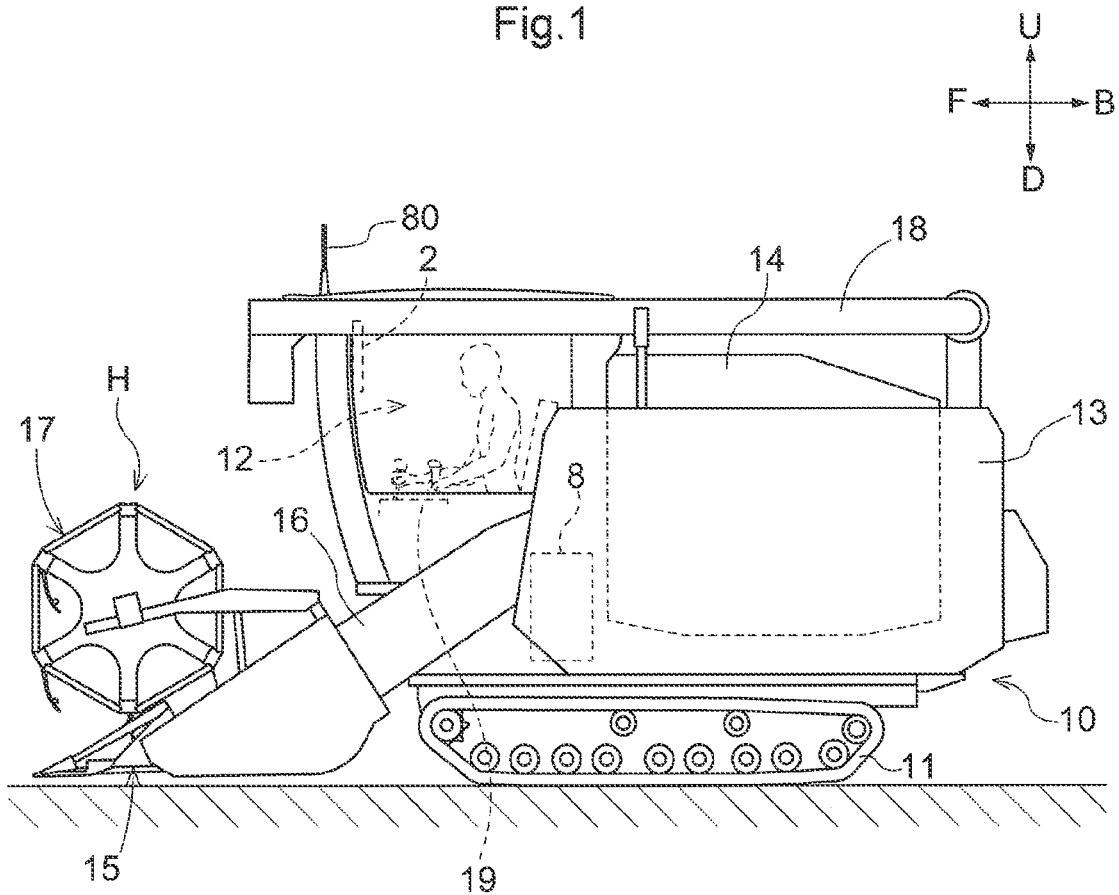
FIG. 1 is a left side view of a combine.

A combine, which is an example of an agricultural vehicle according to the present invention, will be described based on the drawings. In the following description, the direction of an arrow F in FIG. 1 is the "forward" direction, the direction of an arrow B is the "backward" direction, the front side of the sheet of FIG. 1 is the "left" side, and the back side of the sheet is the "right" side. Also, the direction of an arrow U in FIG. 1 is the "upward" direction, and the direction of an arrow D is the "downward" direction.

Overall Configuration of Combine

As shown in FIG. 1, the combine includes a crawler-type traveling device 11, a driving unit 12, a threshing device 13, a grain tank 14, a harvesting device H, a conveying device 16, a grain discharge device 18, and a satellite positioning module 80. The conveying device 16, the threshing device 13, and the harvesting device H are examples of work devices.

As shown in FIG. 1, the traveling device 11 is provided in the lower portion of a travel vehicle body 10. The combine can be self-propelled by the traveling device 11.

Also, the driving unit 12, the threshing device 13, and the grain tank 14 are provided above the traveling device 11. An observer who monitors the work of the combine can ride in the driving unit 12. Note that the observer may monitor the work of the combine from outside the combine.

The grain discharge device 18 is provided above the grain tank 14. Also, the satellite positioning module 80 is attached to the upper surface of the driving unit 12.

The harvesting device H is provided in the front portion of the combine. The conveying device 16 is provided behind the harvesting device H. Also, the harvesting device H includes a cutting mechanism 15 and a reel 17.

The cutting mechanism 15 reaps planted culm in a field. Also, the reel 17 is driven to rotate so as to rake in the planted culm that is to be harvested. According to this configuration, the harvesting device H performs work to harvest grain (hereinafter also referred to as "crop") in the field. The combine can perform harvest travel (work travel) by traveling with use of the traveling device 11 while also harvesting grain in the field with use of the harvesting device H.

As described above, the combine includes the harvesting device H that harvests grain in the field and the traveling device 11.

The reaped culm that was reaped by the cutting mechanism 15 is conveyed to the threshing device 13 by the conveying device 16. The reaped culm is threshed in the threshing device 13. The grain obtained by the threshing is stored in the grain tank 14. The grain stored in the grain tank 14 is discharged to the outside of the machine by the grain discharge device 18 as needed. The harvesting device H, the traveling device 11, the conveying device 16, and the threshing device 13 are driven by an engine 8, which is an example of a motive power source.

As described above, the combine includes the grain tank 14 for storing grain harvested by the harvesting device H.

Figure 3:
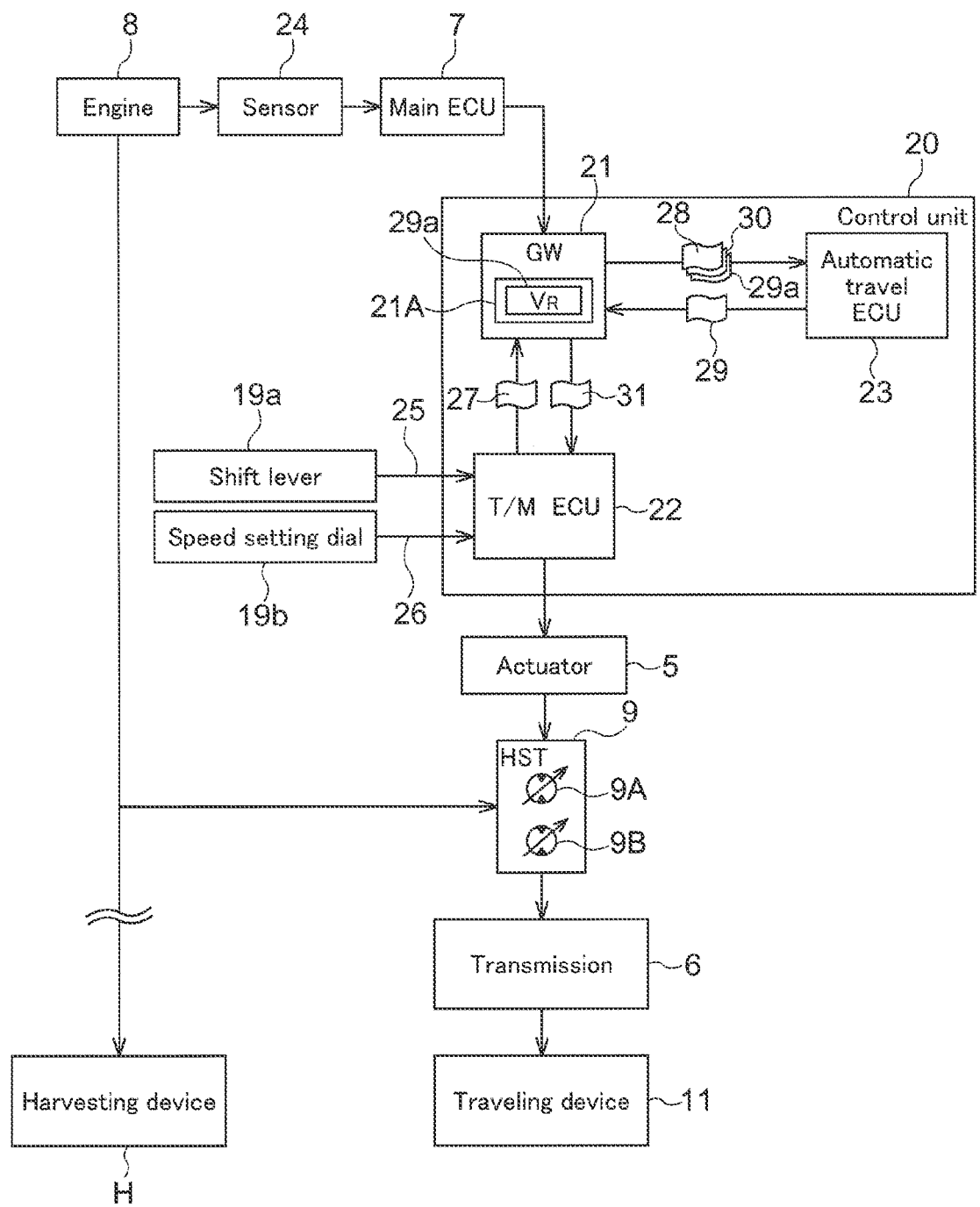
FIG. 3 is a diagram showing examples of a motive power transmission configuration and a vehicle speed control configuration together.

A communication terminal 2 and an operation panel 19 are disposed in the driving unit 12. In FIG. 1, the communication terminal 2 is fixed in the driving unit 12. However, the present invention is not limited to this, and the communication terminal 2 may be configured to be detachable from the driving unit 12. Also, the communication terminal 2 may be taken out of the combine. As shown in FIG. 3, the operation panel 19 includes a swingable shift lever 19a for a gear shift operation of a continuously variable transmission 9 (i.e., for adjusting swashplate angle of a hydraulic pump 9A), an auxiliary gear shift switch (not shown) configured to be pressed to make a gear shift operation of the continuously variable transmission 9 (i.e., to adjust swashplate angle of a hydraulic motor 9B), a speed setting dial 19b for setting a correspondence relationship between an operated position of the shift lever 19a and the swashplate of the hydraulic pump 9A in the continuously variable transmission 9, various other manual operation members (not shown), and the like. Note that operation members such as the shift lever 19a, the auxiliary gear shift switch, and the speed setting dial 19b that are used for adjusting the speed are collectively referred to as "gear shift operation members". A configuration is also possible in which only the shift lever 19a is provided as a gear shift operation member, or the auxiliary gear shift switch, the speed setting dial 19b, or another operation member is additionally provided in combination with the shift lever 19a.

Harvest Travel

Harvesting work is performed by the combine in a field as described below.

Figure 2:
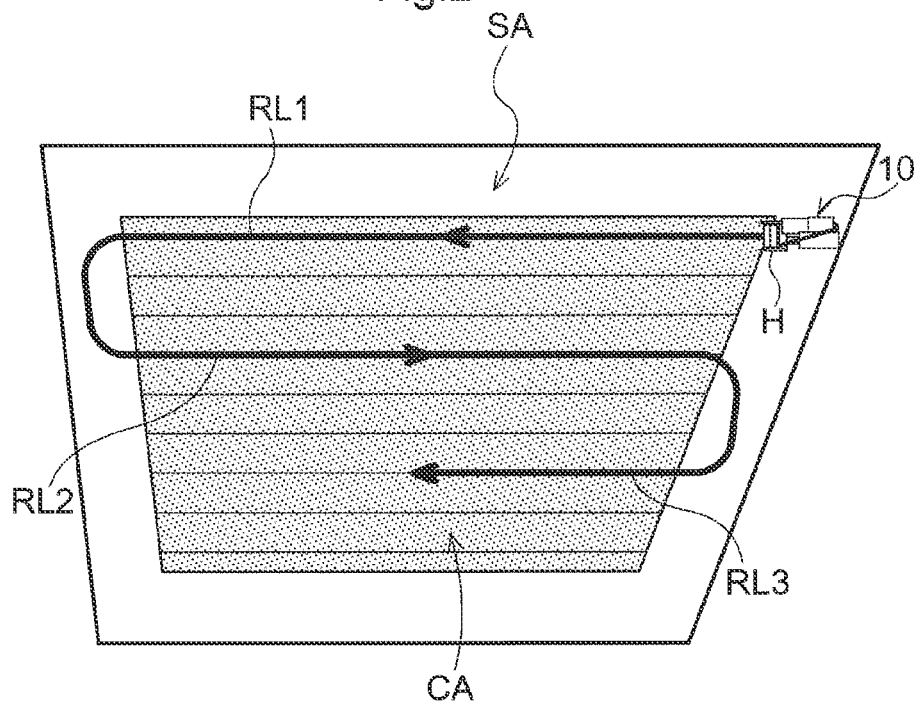
FIG. 2 is a diagram showing an example of travel routes in harvest travel.

First, a driver who also serves as an observer manually operates the combine and performs harvest travel so as to travel in laps (hereinafter also referred to as "peripheral reaping") along the boundary line of the field in the outer peripheral portion in the field as shown in FIG. 2. The thus reaped area (worked area) constitutes an outer peripheral area SA. An area that is left inside the outer peripheral area SA as an unreaped area (unworked area) constitutes a work target area CA. FIG. 2 shows an example of the outer peripheral area SA and the work target area CA. Although the peripheral reaping is performed by manual travel, at this time, the combine may be operated by the driver riding in the combine, or an observer or the like may also cause the combine to travel by remote operation.

Also, at this time, the driver causes the combine to travel in two or three laps to make the width of the outer peripheral area SA wide to some extent. In this travel, the width of the outer peripheral area SA increases by the width of work performed by the combine every time the combine travels in a lap. When the travel in the first two or three laps is complete, the width of the outer peripheral area SA is about two to three times the width of work performed by the combine.

The outer peripheral area SA is used as a space for the combine to turn when performing harvest travel in the work target area CA. The outer peripheral area SA is also used as a space for moving to a grain discharge site, a refueling site, or the like after temporarily ending the harvest travel.

After the peripheral reaping is performed, harvest travel is performed in the work target area CA. In a case where the harvest travel is performed by automatically, travel routes in the work target area CA are calculated as shown in FIG. 2. The calculated travel routes are successively generated based on a pattern of the harvest travel, and the combine automatically travels along the generated travel routes. In a case where the harvest travel is performed manually, the combine successively travels along suitably determined travel routes. The harvest travel is constituted by harvest travel (work travel) for performing harvesting work and turn travel (non-work travel) for connecting route segments in which work travel is performed. Note that the combine has turn patterns for the turn travel, such as a U-turn pattern in which the combine turns along a U-shaped turn travel route as shown in FIG. 2, an a-turn pattern in which the combine turns while repeatedly traveling forward and backward, and a switch back turn pattern in which the combine turns similarly to the U-turn pattern in a narrower area than in the U-turn pattern by traveling backward.

Device Configuration for Vehicle Speed Control

As described above, the engine 8 drives various work devices such as the threshing device 13 and the harvesting device H, in addition to the traveling device 11. If the load on a work device increases during work travel due to an increase in the amount of crops that need to be processed, for example, the driving force required by the work device may be insufficient. Therefore, the driving force necessary for the work device is secured by measuring the load applied to the engine 8 during travel and controlling the vehicle speed so as to make the load smaller than or equal to a predetermined load. The following describes an example configuration for controlling the vehicle speed in harvest travel (work travel) using FIGS. 3 to 7 in an exemplary case where a reduction in the rotational frequency of the engine (hereinafter referred to as an "engine down amount") is measured as an engine load and the harvesting device H is used as the work device.

As shown in FIG. 3, operation values of the shift lever 19a and the speed setting dial 19b, which are gear shift operation members for manually changing the vehicle speed, are input to a control unit 20. Similarly, an engine down amount of the engine 8 is input to the control unit 20. At this time, the engine down amount may be converted to a load level by a main ECU 7, and the converted load level may also be input to the control unit 20. The following describes an example configuration in which the converted load level is input to the control unit 20. The control unit 20 controls the continuously variable transmission 9 that is constituted by an HST, which is a hydrostatic continuously variable transmission, via an actuator 5, and transmits a driving force of the engine 8 to a transmission 6. The traveling device 11 operates as a result of the driving force of the engine 8 being transmitted from the transmission 6. Note that the harvesting device H operates as a result of the driving force of the engine 8 being transmitted via a gear shift device (not shown).

Figure 4:
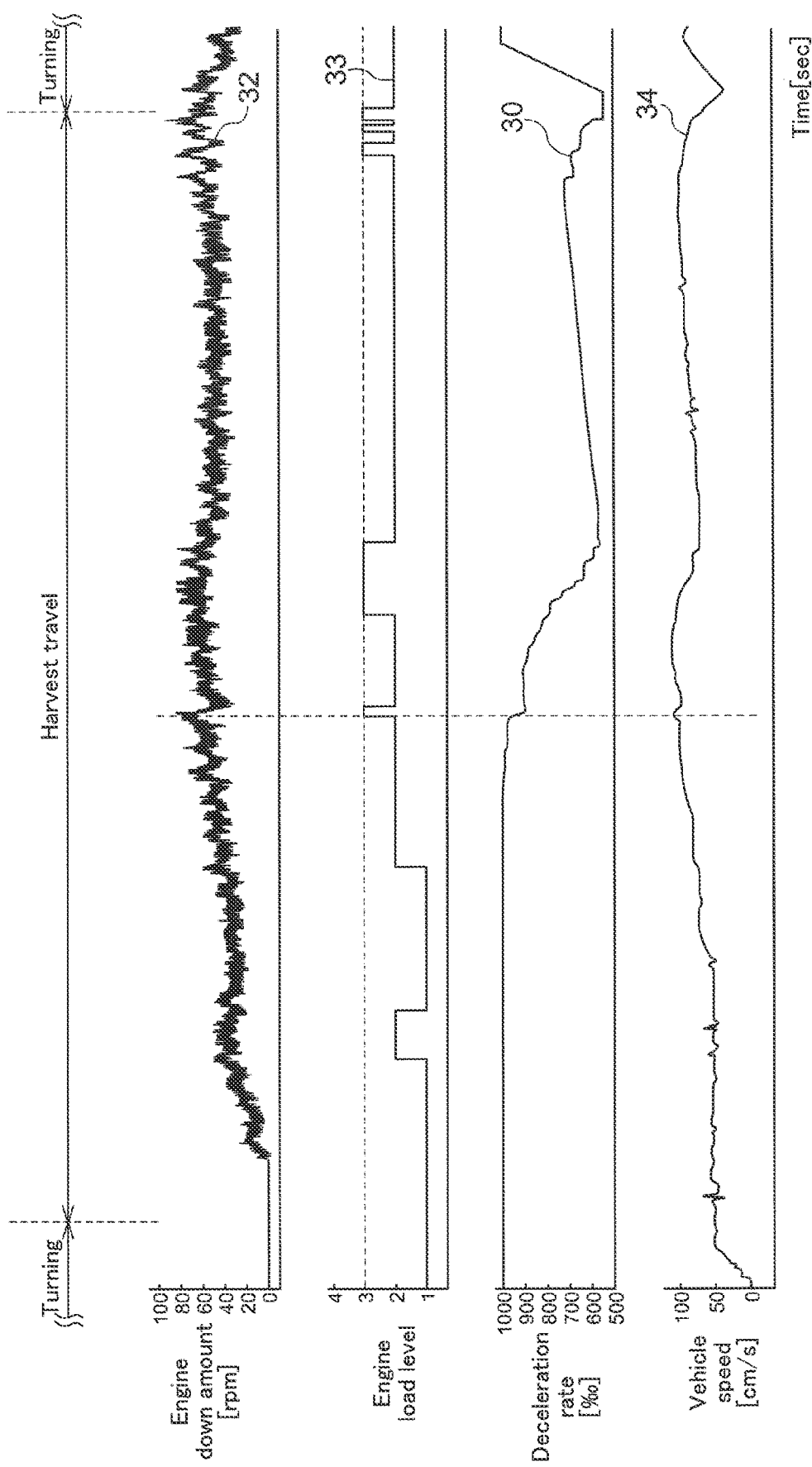
FIG. 4 is a diagram showing an example of vehicle speed control corresponding to an engine load.

Specifically, as shown in FIGS. 3 and 4, a sensor 24 measures the rotational frequency of the engine 8 over time and transmits the measured rotational frequency to the main ECU 7. Based on the received rotational frequency of the engine 8, the main ECU 7 calculates an engine down amount 32 that is an amount by which the rotational frequency has decreased for a predetermined period, and converts the engine down amount 32 to an engine load level (hereinafter referred to as a "load level 33") that is determined in advance so as to correspond to the engine down amount 32. For example, the load level 33 includes five levels from level 1 to level 5. When the engine down amount 32 is greater than or equal to 0 [rpm] and no greater than 41 [rpm], the main ECU 7 converts the engine down amount 32 to level 1. Level 2 corresponds to a case where the engine down amount 32 is greater than 41 [rpm] and no greater than 67 [rpm], level 3 corresponds to a case where the engine down amount 32 is greater than 67 [rpm] and no greater than 118 [rpm], level 4 corresponds to a case where the engine down amount 32 is greater than 118 [rpm] and no greater than 222 [rpm], and level 5 corresponds to a case where the engine down amount 32 is greater than 222 [rpm]. The main ECU 7 transmits the converted load level 33 and the engine down amount 32 to the control unit 20. Note that the converted load level 33 may be displayed in a display unit (not shown) in the driving unit 12 or the like so that a worker can check the engine load during work.

The worker can adjust the vehicle speed by using the gear shift operation members. For example, the shift lever 19*a* and the speed setting dial 19*b* are used as the gear shift operation members. An operation amount of the shift lever 19*a* is transmitted as a lever detection value 25 to the control unit 20. An operation amount of the speed setting dial 19*b* is transmitted as a dial detection value 26 to the control unit 20.

The control unit 20 is constituted by one or more electronic control units such as ECUs. The control unit 20 includes a gateway 21, a transmission ECU 22, and an automatic travel ECU 23. The transmission ECU 22 directly controls a gear shift device that is constituted by the continuously variable transmission 9 and the transmission 6, and the automatic travel ECU 23 controls the vehicle speed via the transmission ECU 22. The lever detection value 25 and the dial detection value 26 are input to the transmission ECU 22 and are converted to a first vehicle speed operation value 27 by the transmission ECU 22, and the first vehicle speed operation value 27 is transmitted to the gateway 21.

The gateway 21 receives the load level 33 transmitted from the main ECU 7 and the first vehicle speed operation value 27. The gateway 21 converts the first vehicle speed operation value 27 to a second vehicle speed operation value 28 and transmits the second vehicle speed operation value 28 to the automatic travel ECU 23. Also, when the load level 33 is higher than or equal to a predetermined level, for example, when the load level 33 is higher than or equal to level 3, the gateway 21 calculates a deceleration rate 30 from the engine down amount 32 so as to maintain a state where the load level 33 is lower than level 3, and transmits the deceleration rate 30 to the automatic travel ECU 23. More specifically, the gateway 21 outputs 1000[‰] as the deceleration rate 30 from when work travel is started in any of the travel routes (RL1 to RL3 in FIG. 2) after turning until level 3 is input as the load level 33. From when level 3 is input as the load level 33, the gateway 21 calculates the deceleration rate 30 from the engine down amount 32. The deceleration rate 30 may be calculated by using a function that is set in advance using the engine down amount 32 as a variable, or may be calculated by using a table in which deceleration rates 30 corresponding to engine down amounts 32 are stored.

The automatic travel ECU 23 calculates a first vehicle speed instruction 29 from the input second vehicle speed operation value 28 and deceleration rate 30, and transmits the first vehicle speed instruction 29 to the gateway 21. The gateway 21 converts the received first vehicle speed instruction 29 to a second vehicle speed instruction 31 and transmits the second vehicle speed instruction 31 to the transmission ECU 22. Also, the gateway 21 includes a storage unit 21A and stores an average value of received first vehicle speed instructions 29 as an optimum vehicle speed instruction 29*a* in the storage unit 21A. Up to 100 first vehicle speed instructions 29 are stored in the storage unit 21A for every 10 msec, and when the number of first vehicle speed instructions exceeds 100, the first vehicle speed instructions are deleted in chronological order from the oldest one so that the latest 100 first vehicle speed instructions 29 are always stored in the storage unit 21A. The gateway 21 stores an average of the 100 first vehicle speed instructions 29 as the optimum vehicle speed instruction 29*a*. Accordingly, during turning, the latest optimum vehicle speed instruction 29*a* of the previous work travel is stored in the storage unit 21A. The stored optimum vehicle speed instruction 29*a* is used in a case where initial work travel control, which will be described later, is performed, and in a case where the initial work travel control is not performed, a configuration is also possible in which the gateway 21 does not include the storage unit 21A.

The transmission ECU 22 controls the actuator 5 based on the received second vehicle speed instruction 31, and the actuator 5 controls the continuously variable transmission 9. The continuously variable transmission 9 includes the variable-capacity hydraulic pump 9A (main transmission) to which motive power is input from the engine 8 and the variable-capacity hydraulic motor 9B (auxiliary transmission) that is driven by pressure oil from the hydraulic pump 9A. A swashplate of the hydraulic pump 9A is driven by the actuator 5 that is constituted by a servo cylinder or the like to change the angle of the swashplate. A swashplate of the hydraulic motor 9B is driven by another actuator (not shown) to change the angle of the swashplate. By changing the angle of the swashplate of the hydraulic pump 9A, the gear ratio of the continuously variable transmission 9 can be changed in a continuously variable manner. Also, by changing the angle of the swashplate of the hydraulic motor 9B, motive power that is output from the continuously variable transmission 9 can be switched between a low gear ratio state for work travel and a high gear ratio state for normal travel.

The transmission 6 changes the speed of motive power input from the continuously variable transmission 9 and transmits the motive power to the traveling device 11. In particular, the motive power input to the traveling device 11 is determined by the second vehicle speed instruction 31, and consequently, a vehicle speed 34 is controlled based on the second vehicle speed instruction 31.

As described above, the engine down amount 32 is detected as an engine load, and the vehicle speed is controlled based on the engine down amount 32 so as to make the engine load smaller than a predetermined load level 33.

With this configuration, even if a load applied to the harvesting device H during reaping work (during reaping travel or work travel) increases, it is possible to estimate the load applied to the harvesting device H from the engine load and increase the driving force to be transmitted to the harvesting device H by reducing the vehicle speed. As a result, a sufficient driving force can be transmitted to the harvesting device H.

Work Travel Control

Work travel control in which the vehicle speed is controlled during reaping travel (during work travel) according to a load on the engine will be described using FIG. 5 with reference to FIGS. 3 and 4. Note that the following describes an exemplary case where control steps are performed with the device configuration shown in FIG. 3, but a suitable device configuration may be adopted. Also, the control unit 20 may have a suitable device configuration, and only needs to be constituted by one or more processors such as ECUs or CPUs and other hardware. Also, operations of the main ECU 7 and the control unit 20 do not necessarily have to be performed by hardware, and may also be realized as a result of a processor (not shown) executing software.

First, whether or not work travel is being performed is determined (step #1). If work travel is not being performed (step #1=No), it is determined that turn travel is being performed, and predetermined turn travel control is performed (step #2).

If it is determined that work travel is being performed (step #1=Yes), whether or not the combine is in an initial work travel area is determined (step #3). The initial work travel area is an area that extends a predetermined length from where the combine starts to travel along a travel route (RL1, RL2, or RL3 in FIG. 2) in which work travel is performed after ending turn travel, and is, for example, an area that extends 10 m from where the combine starts to travel along the travel route.

If it is determined that the combine is in the initial work travel area (step #3=Yes), initial work travel control, which will be described later, is performed (step #4). Note that the initial work travel control does not necessarily have to be performed, and a configuration is also possible in which only the following work travel control is performed during work travel.

If it is determined that the combine is not in the initial work travel area (step #3=No), specific work travel control is performed. Even when the work travel control is being performed, the vehicle speed is usually adjusted by using the shift lever 19a, the speed setting dial 19b, or the like. Therefore, the gateway 21 receives the first vehicle speed operation value 27 that corresponds to operations made on the shift lever 19a and the speed setting dial 19b via the transmission ECU 22, converts the first vehicle speed operation value 27 to the second vehicle speed operation value 28, and outputs the second vehicle speed operation value 28 (step #5).

Here, the rotational frequency of the engine 8 is measured over time by the sensor 24 during work travel. The main ECU 7 calculates the engine down amount 32 based on a change amount of the measured rotational frequency. Furthermore, the main ECU 7 determines the load level 33 from the engine down amount 32. The gateway 21 continuously receives the engine down amount 32 and the load level 33 as a load applied to the engine (step #6).

Also, when the load level 33 becomes level 3, the gateway 21 calculates the deceleration rate 30 based on the engine down amount 32 and outputs the deceleration rate 30 to the automatic travel ECU 23. Note that the gateway 21 outputs 1000[‰] as the deceleration rate 30 until the load level 33 becomes level 3 (step #7).

The automatic travel ECU 23 receives the deceleration rate 30 (step #8) and the second vehicle speed operation value 28 (step #9) from the gateway 21. The automatic travel ECU 23 outputs, as the first vehicle speed instruction 29, a vehicle speed instruction that corresponds to a vehicle speed 34 obtained by multiplying a vehicle speed that is determined from the second vehicle speed operation value 28 and corresponds to the shift lever 19a and the speed setting dial 19b, by the deceleration rate 30. According to this configuration, while the load applied to the engine 8 is small, the deceleration rate 30 is 1000[‰], and accordingly, the combine travels at a vehicle speed 34 that corresponds to the shift lever 19a and the speed setting dial 19b. After the load level 33 becomes level 3 and an increase in the load applied to the engine 8 is detected, the deceleration rate 30 corresponding to the engine down amount 32 is calculated, and the combine is decelerated and travels at a vehicle speed 34 that is obtained by multiplying the vehicle speed corresponding to the shift lever 19a and the speed setting dial 19b by the deceleration rate 30. Thus, the vehicle speed 34 is controlled so as to make the load level 33 corresponding to the load applied to the engine 8 lower than the predetermined level 3. As a result, a larger amount of the driving force of the engine 8 is transmitted to the harvesting device H, and the driving force of the engine 8 is sufficiently transmitted to the harvesting device H.

Next, the gateway 21 receives the first vehicle speed instruction 29, converts the first vehicle speed instruction 29 to the second vehicle speed instruction 31 for the transmission ECU 22, and outputs the second vehicle speed instruction 31 (step #10). At the same time, in the case where the initial work travel control is performed, an average value of first vehicle speed instructions 29 is stored as the optimum vehicle speed instruction 29a in the storage unit 21A. Then, the processing returns to the step (step #1) of determining whether or not work travel is being performed.

Finally, the transmission ECU 22 receives the second vehicle speed instruction 31 and controls the actuator 5 based on the second vehicle speed instruction 31 (step #11). Then, the processing returns to the step (step #1) of determining whether or not work travel is being performed.

The actuator 5 controls the continuously variable transmission 9 to transmit a driving force of the engine 8 corresponding to the second vehicle speed instruction 31 via the transmission 6 to the traveling device 11 and control travel (vehicle speed).

Initial Work Travel Control

The initial work travel control corresponding to step #4 in FIG. 5 will be described using FIGS. 6 and 7 with reference to FIGS. 3 and 4. In the initial work travel control, while the combine is traveling in the initial work travel area that extends 10 m from where the combine starts work travel after turn travel, the vehicle speed 34 is controlled based on a set vehicle speed $V_S$ that is set in advance as a standard work travel vehicle speed and an optimum vehicle speed $V_R$ that corresponds to the optimum vehicle speed instruction 29a, according to a result of comparison with an operation vehicle speed $V_M$ that corresponds to the shift lever 19a and the speed setting dial 19b. The following describes a case where the set vehicle speed $V_S$ is 1.0 [m/sec] as an example. The initial work travel control described below is performed in the initial work travel area of the travel route RL2 shown in FIG. 2, and the optimum vehicle speed $V_R$ is a vehicle speed that corresponds to an optimum vehicle speed instruction 29a that is stored last in the storage unit 21A with respect to the travel route RL1.

First, whether or not the operation vehicle speed $V_M$ is higher than the set vehicle speed $V_S$ is determined (step #41). If the operation vehicle speed $V_M$ is higher than the set vehicle speed $V_S$ (step #41=Yes), whether or not the averaged optimum vehicle speed $V_R$ is higher than the set vehicle speed $V_S$ is determined (step #42).

Here, a reaping width (work width) of the travel route RL2 may differ from a reaping width of the travel route RL1. In this case, the load applied to the harvesting device H increases in proportion to the reaping width. Accordingly, the optimum vehicle speed $V_R$ also varies according to the reaping width. Therefore, a configuration is also possible in which the reaping width of the travel route RL1 is stored in the storage unit 21A, and the optimum vehicle speed $V_R$ is corrected based on a ratio between the reaping width of the travel route RL1 and the reaping width of the travel route RL2. Specifically, the optimum vehicle speed $V_R$ used in the travel route RL2 is preferably calculated using the following relational expression where $V_{R-}$ represents an optimum vehicle speed in the travel route RL1, W1 represents the reaping width of the travel route RL1, and W2 represents the reaping width of the travel route RL2.

$$V_R = V_{R-} \times (W1/W2)$$

Also, in a case where work travel is performed a plurality of times with turn travel interposed therebetween, a configuration is also possible in which every time turn travel is performed, an optimum vehicle speed $V_R$ that corresponds to the largest reaping width is updated based on the reaping width and the averaged optimum vehicle speed $V_R$, and an optimum vehicle speed $V_R$ that corresponds to the reaping width of target work travel is determined. In this case, every time work travel is repeated, accuracy of the calculated optimum vehicle speed $V_R$ corresponding to the largest reaping width improves, and the vehicle speed is controlled more appropriately and immediately.

If the optimum vehicle speed $V_R$ is higher than the set vehicle speed $V_S$ (step #42=Yes), travel is started with the vehicle speed 34 set to 1.0 [m/sec], which is the set vehicle speed $V_S$ (step #43), and thereafter, the second vehicle speed instruction 31 is set to a value that corresponds to the optimum vehicle speed $V_R$, and the vehicle speed 34 is gradually increased to the optimum vehicle speed $V_R$ as shown by a vehicle speed transition 35. After reaching the optimum vehicle speed $V_R$, the vehicle speed 34 is kept at the optimum vehicle speed $V_R$ while the combine is in the initial work travel area.

Here, ramp processing may be performed according to the load level 33 when the vehicle speed is increased to the optimum vehicle speed $V_R$ (step #44). For example, the lower the load level 33 is, the higher an acceleration rate at which the vehicle speed is increased to the optimum vehicle speed $V_R$ is. Specifically, the vehicle speed 34 is increased to the optimum vehicle speed $V_R$ as shown by a vehicle speed transition 35a when the load level 33 is level 1, the vehicle speed 34 is increased to the optimum vehicle speed $V_R$ as shown by a vehicle speed transition 35b when the load level 33 is level 2, and the vehicle speed 34 is increased to the optimum vehicle speed $V_R$ as shown by a vehicle speed transition 35c when the load level 33 is level 3, and the acceleration rate decreases in this order.

Thereafter, whether or not the combine has passed the initial work travel area is determined (step #49), and if it is determined that the combine has not passed the initial work travel area (step #49=Yes), the vehicle speed 34 is maintained, and if it is determined that the combine has passed the initial work travel area (step #49=No), the work travel control is performed (step #50).

If the optimum vehicle speed $V_R$ is lower than or equal to the set vehicle speed $V_S$ (step #42=No), the second vehicle speed instruction 31 is set to a value that corresponds to the optimum vehicle speed $V_R$, and the vehicle speed 34 is kept constant at the optimum vehicle speed $V_R$ as shown by a vehicle speed transition 36 (step #45). Thereafter, whether or not the combine has passed the initial work travel area is determined (step #49), and if it is determined that the combine has not passed the initial work travel area (step #49=Yes), the vehicle speed 34 is maintained, and if it is determined that the combine has passed the initial work travel area (step #49=No), the work travel control is performed (step #50).

If it is determined that the operation vehicle speed $V_M$ is lower than or equal to the set vehicle speed $V_S$ (step #41=No), whether or not the optimum vehicle speed $V_R$ is lower than the operation vehicle speed $V_M$ is determined (step #46). If the optimum vehicle speed $V_R$ is lower than the operation vehicle speed $V_M$ (step #46=Yes), the second vehicle speed instruction 31 is set to a value that corresponds to the optimum vehicle speed $V_R$, and the vehicle speed 34 is kept constant at the optimum vehicle speed $V_R$ as shown by a vehicle speed transition 37 (step #47). Thereafter, whether or not the combine has passed the initial work travel area is determined (step #49), and if it is determined that the combine has not passed the initial work travel area (step #49=Yes), the vehicle speed 34 is maintained, and if it is determined that the combine has passed the initial work travel area (step #49=No), the work travel control is performed (step #50).

If the optimum vehicle speed $V_R$ is higher than or equal to the operation vehicle speed $V_M$ (step #46=No), the second vehicle speed instruction 31 is set to a value that corresponds to the operation vehicle speed $V_M$, and the vehicle speed 34 is kept constant at the operation vehicle speed $V_M$ as shown by a vehicle speed transition 38 (step #48). Thereafter, whether or not the combine has passed the initial work travel area is determined (step #49), and if it is determined that the combine has not passed the initial work travel area (step #49=Yes), the vehicle speed 34 is maintained, and if it is determined that the combine has passed the initial work travel area (step #49=No), the work travel control is performed (step #50).

As described above, the vehicle speed 34 is controlled based on the set vehicle speed $V_S$ and the optimum vehicle speed $V_R$ that corresponds to the optimum vehicle speed instruction 29a, according to a result of comparison with the operation vehicle speed $V_M$ that corresponds to the shift lever 19a and the speed setting dial 19b. With this configuration, the vehicle speed 34 can be controlled based on a result of control performed in the travel route RL1 from the beginning of the initial work travel area of the travel route RL2, and it becomes easy to control the vehicle speed 34 stably and appropriately in the initial work travel area.

Other Embodiments (1) In the above embodiment, the initial work travel area is described as being determined based on a distance from where work travel is started after turn travel is ended, but there is no limitation thereto. For example, the initial work travel area may be determined based on a period of time from when work travel is started after turn travel is ended.

(2) In the above embodiment, turn travel is described as an example of non-work travel, but the non-work travel is not limited to the turn travel. For example, in a case where the field is divided into sections, non-work travel may be travel that is performed after work travel is performed in a section of the field until the combine moves to another section of the field and performs work travel in that section. In the case where the field is divided into sections, states of crops are often similar between the sections of the divided field. Accordingly, optimum vehicle speeds $V_R$ for the respective sections of the field are often close to each other, and it is expected that the initial work travel control can be appropriately performed in such a case as well.

(3) In each of the above embodiments, the vehicle speed control can be applied to both automatic travel and manual travel. Also, the turn travel is performed with a suitable turn pattern, which may be the a-turn pattern or the switch back turn pattern, as well as the U-turn pattern.

(4) In each of the above embodiments, the traveling device 11 is not limited to the crawler-type, and may also be a wheel-type traveling device 11.

(5) In each of the above embodiments, the work device is not limited to the harvesting device H and the threshing device 13, and may also be various agricultural devices such as a rice transplanter. Similarly, the work travel is not limited to travel performed in reaping work, and may also be travel performed in various types of agricultural work such as harvesting work and rice transplanting work.

INDUSTRIAL APPLICABILITY

The present invention is suitable not only for a vehicle speed control system of a normal-type combine but also for vehicle speed control systems of various types of agricultural vehicles such as a head-feeding combine.

DESCRIPTION OF REFERENCE SIGNS

8: Engine (motive power source)
13: Threshing device (work device)
19a: Shift lever
19b: Speed setting dial
20: Control unit
21A: Storage unit
24: Sensor
34: Vehicle speed
H: Harvesting device (work device)
RL1: Travel route
RL2: Travel route

The invention claimed is:

1. A vehicle speed control system that controls a vehicle speed of an agricultural vehicle that performs work using a work device while traveling using a traveling device,
wherein the agricultural vehicle performs work travel a plurality of times with non-work travel interposed therebetween, the vehicle speed control system comprising:
a control unit configured to perform work travel control in which the vehicle speed is set according to a load on a motive power source that drives the traveling device and the work device; and
a storage unit in which the vehicle speed that is set during the work travel is stored as an optimum vehicle speed,
wherein the control unit performs initial work travel control in which a vehicle speed at a time when the work travel is started after the non-work travel is set using the optimum vehicle speed that is stored during the work travel performed before the non-work travel,
wherein the initial work travel control is performed over a predetermined work travel distance or for a predetermined period of time from when the work travel is started, and the work travel control is performed after the initial work travel control, and
wherein the control unit stores, as a first work width, a work width across which work was performed in the work travel before the non-work travel, in the storage unit, and corrects the optimum vehicle speed based on a ratio between the first work width and a second work width that is a work width across which work is to be performed in the work travel after the non-work travel.

2. The vehicle speed control system according to claim 1, wherein the optimum vehicle speed is determined by averaging vehicle speeds that are set within a predetermined period before a vehicle speed that is set last and the last set vehicle speed, among vehicle speeds that are set during the work travel performed before the non-work travel.

3. A vehicle speed control system that controls a vehicle speed of an agricultural vehicle that performs work using a work device while traveling using a traveling device,
wherein the agricultural vehicle performs work travel a plurality of times with non-work travel interposed therebetween, the vehicle speed control system comprising:
a control unit configured to perform work travel control in which a vehicle speed is set according to a load on a motive power source that drives the traveling device and the work device;
a storage unit in which a vehicle speed that is set during the work travel is stored as an optimum vehicle speed; and
a gear shift operation member that is used for manually adjusting the vehicle speed,
wherein the control unit performs initial work travel control in which a vehicle speed at a time when the work travel is started after the non-work travel is set using the optimum vehicle speed that is stored during the work travel performed before the non-work travel,
wherein a reference value of the vehicle speed is set as a set vehicle speed in the initial work travel control,
wherein, in the initial work travel control, if a vehicle speed that corresponds to an operation made on the gear shift operation member is higher than the set vehicle speed and the optimum vehicle speed is higher than the set vehicle speed, the vehicle speed is set to the set vehicle speed and thereafter increased to the optimum vehicle speed, and
wherein, in the initial work travel control, if the vehicle speed corresponding to the operation made on the gear shift operation member is higher than the set vehicle speed and the optimum vehicle speed is lower than or equal to the set vehicle speed, the vehicle speed is set to the optimum vehicle speed.

4. The vehicle speed control system according to claim 3, wherein the vehicle speed is increased to the optimum vehicle speed at an acceleration rate that is determined based on the magnitude of the load, and the larger the load is, the lower the acceleration rate is set.

5. A vehicle speed control system that controls a vehicle speed of an agricultural vehicle that performs work using a work device while traveling using a traveling device, wherein the agricultural vehicle performs work travel a plurality of times with non-work travel interposed therebetween, the vehicle speed control system comprising:
- a control unit configured to perform work travel control in which a vehicle speed is set according to a load on a motive power source that drives the traveling device and the work device;
- a storage unit in which a vehicle speed that is set during the work travel is stored as an optimum vehicle speed; and
- a gear shift operation member that is used for manually adjusting the vehicle speed, wherein the control unit performs initial work travel control in which a vehicle speed at a time when the work travel is started after the non-work travel is set using the optimum vehicle speed that is stored during the work travel performed before the non-work travel, wherein a reference value of the vehicle speed is set as a set vehicle speed in the initial work travel control, wherein, in the initial work travel control, if a vehicle speed that corresponds to an operation made on the gear shift operation member is lower than or equal to the set vehicle speed and the optimum vehicle speed is lower than the vehicle speed corresponding to the operation made on the gear shift operation member, the vehicle speed is set to the optimum vehicle speed, and wherein, in the initial work travel control, if the vehicle speed corresponding to the operation made on the gear shift operation member is lower than or equal to the set vehicle speed and the optimum vehicle speed is higher than or equal to the vehicle speed corresponding to the operation made on the gear shift operation member, the vehicle speed is set to the vehicle speed corresponding to the operation made on the gear shift operation member.

6. The vehicle speed control system according to claim 1, wherein a change amount of a rotational frequency of the motive power source is detected as the load.

7. The vehicle speed control system according to claim 1, wherein the agricultural vehicle travels automatically.

8. The vehicle speed control system according to claim 1, further comprising:
- a gear shift operation member that is used for manually adjusting the vehicle speed, wherein a reference value of the vehicle speed is set as a set vehicle speed in the initial work travel control, wherein, in the initial work travel control, if a vehicle speed that corresponds to an operation made on the gear shift operation member is higher than the set vehicle speed and the optimum vehicle speed is higher than the set vehicle speed, the vehicle speed is set to the set vehicle speed and thereafter increased to the optimum vehicle speed, and wherein, in the initial work travel control, if the vehicle speed corresponding to the operation made on the gear shift operation member is higher than the set vehicle speed and the optimum vehicle speed is lower than or equal to the set vehicle speed, the vehicle speed is set to the optimum vehicle speed.

9. The vehicle speed control system according to claim 2, further comprising:
- a gear shift operation member that is used for manually adjusting the vehicle speed, wherein a reference value of the vehicle speed is set as a set vehicle speed in the initial work travel control, wherein, in the initial work travel control, if a vehicle speed that corresponds to an operation made on the gear shift operation member is higher than the set vehicle speed and the optimum vehicle speed is higher than the set vehicle speed, the vehicle speed is set to the set vehicle speed and thereafter increased to the optimum vehicle speed, and wherein, in the initial work travel control, if the vehicle speed corresponding to the operation made on the gear shift operation member is higher than the set vehicle speed and the optimum vehicle speed is lower than or equal to the set vehicle speed, the vehicle speed is set to the optimum vehicle speed.

10. The vehicle speed control system according to claim 1, further comprising:
- a gear shift operation member that is used for manually adjusting the vehicle speed, wherein a reference value of the vehicle speed is set as a set vehicle speed in the initial work travel control, wherein, in the initial work travel control, if a vehicle speed that corresponds to an operation made on the gear shift operation member is lower than or equal to the set vehicle speed and the optimum vehicle speed is lower than the vehicle speed corresponding to the operation made on the gear shift operation member, the vehicle speed is set to the optimum vehicle speed, and wherein, in the initial work travel control, if the vehicle speed corresponding to the operation made on the gear shift operation member is lower than or equal to the set vehicle speed and the optimum vehicle speed is higher than or equal to the vehicle speed corresponding to the operation made on the gear shift operation member, the vehicle speed is set to the vehicle speed corresponding to the operation made on the gear shift operation member.

11. The vehicle speed control system according to claim 2, further comprising:
- a gear shift operation member that is used for manually adjusting the vehicle speed, wherein a reference value of the vehicle speed is set as a set vehicle speed in the initial work travel control, wherein, in the initial work travel control, if a vehicle speed that corresponds to an operation made on the gear shift operation member is lower than or equal to the set vehicle speed and the optimum vehicle speed is lower than the vehicle speed corresponding to the operation made on the gear shift operation member, the vehicle speed is set to the optimum vehicle speed, and wherein, in the initial work travel control, if the vehicle speed corresponding to the operation made on the gear shift operation member is lower than or equal to the set vehicle speed and the optimum vehicle speed is higher than or equal to the vehicle speed corresponding to the operation made on the gear shift operation member, the vehicle speed is set to the vehicle speed corresponding to the operation made on the gear shift operation member.

12. The vehicle speed control system according to claim 3, further comprising:
- a gear shift operation member that is used for manually adjusting the vehicle speed, wherein a reference value of the vehicle speed is set as a set vehicle speed in the initial work travel control, wherein, in the initial work travel control, if a vehicle speed that corresponds to an operation made on the gear shift operation member is lower than or equal to the set vehicle speed and the optimum vehicle speed is lower than the vehicle speed corresponding to the operation made on the gear shift operation member, the vehicle speed is set to the optimum vehicle speed, and wherein, in the initial work travel control, if the vehicle speed corresponding to the operation made on the gear shift operation member is lower than or equal to the set vehicle speed and the optimum vehicle speed is higher than or equal to the vehicle speed corresponding to the operation made on the gear shift operation member, the vehicle speed is set to the vehicle speed corresponding to the operation made on the gear shift operation member.

13. The vehicle speed control system according to claim 4, further comprising:

a gear shift operation member that is used for manually adjusting the vehicle speed, wherein a reference value of the vehicle speed is set as a set vehicle speed in the initial work travel control, wherein, in the initial work travel control, if a vehicle speed that corresponds to an operation made on the gear shift operation member is lower than or equal to the set vehicle speed and the optimum vehicle speed is lower than the vehicle speed corresponding to the operation made on the gear shift operation member, the vehicle speed is set to the optimum vehicle speed, and wherein, in the initial work travel control, if the vehicle speed corresponding to the operation made on the gear shift operation member is lower than or equal to the set vehicle speed and the optimum vehicle speed is higher than or equal to the vehicle speed corresponding to the operation made on the gear shift operation member, the vehicle speed is set to the vehicle speed corresponding to the operation made on the gear shift operation member.

* * * * *